April 18, 1961 H. G. PYLES 2,980,373
SHOCK ABSORBING MOUNT

Filed Nov. 3, 1959 2 Sheets-Sheet 1

INVENTOR
Harley G. Pyles

BY Mason, Fenwick & Lawrence
ATTORNEYS

INVENTOR
Harley G. Pyles
BY Mason, Fenwick & Lawrence
ATTORNEYS

United States Patent Office
2,980,373
Patented Apr. 18, 1961

2,980,373
SHOCK ABSORBING MOUNT

Harley G. Pyles, Morgantown, W. Va., assignor to Galis Electric & Machine Company, Morgantown, W. Va., a corporation of West Virginia Filed Nov. 3, 1959, Ser. No. 850,661

3 Claims. (Cl. 248—15)

This invention relates to improvements in mounting means, and particularly to shock absorbing means for the mounting of planetary gear systems to protect the gearing of the system.

Gear systems are frequently subjected to heavy shocks due to power surges, sudden applications of power, and any power fluctuation which will cause sudden movement of one gear, or portion of the system, relative to another. Such shocks are more severe where the system has play, or lost motion, as the power can build up before the impact, particularly when the direction of movement of the system is being reversed. An instance of this is in vehicles of endless track type where a planetary gear system is used and the track chain and drive chain both are loose. When power is reversed, the slack of the entire system must be taken up before motion is imparted to the track. When the slack is removed, the entire power load strikes an impact blow on the gear system developing terrific torque strains.

The object of the present invention is to provide a mounting which will absorb shocks of this kind to relieve the mechanism and to prevent damage to it.

Another object is to provide a mounting which will allow the gear system, or a part of it, some resiliently opposed movement so that it may move with suddenly imposed loads to minimize their effect.

A more specific object of the invention is to provide a mounting for the non-rotatable ring gear of a planetary system which will place the gear offset from its yieldable mounting so that the gear will be free to move under impact shock but return immediately to its predetermined operative position.

Other objects of the invention will become apparent from the following description of one practical embodiment thereof when taken in conjunction with the drawings which accompany, and form part of, this specification.

Figure 1:
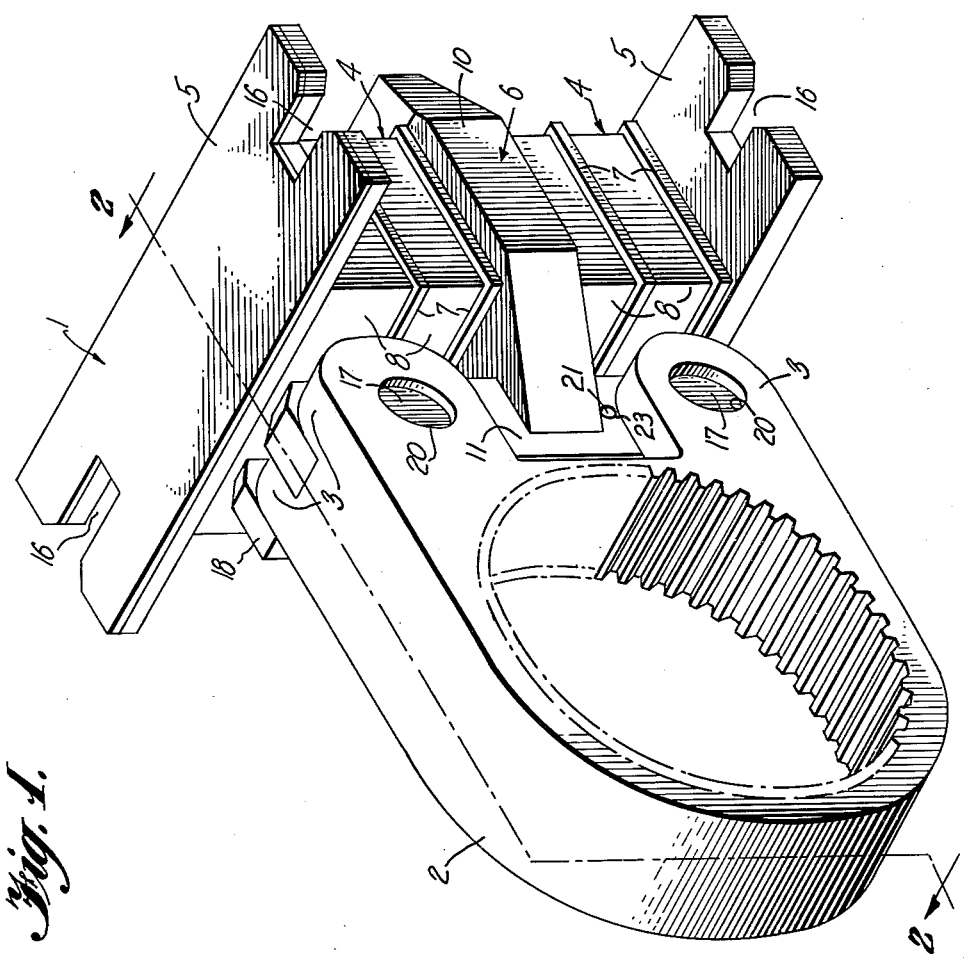
Figure 1 is a perspective view of a non-rotatable internal ring gear of a planetary gear system having a mount- constructed in accordance with the principles of the present invention.
Figure 2:
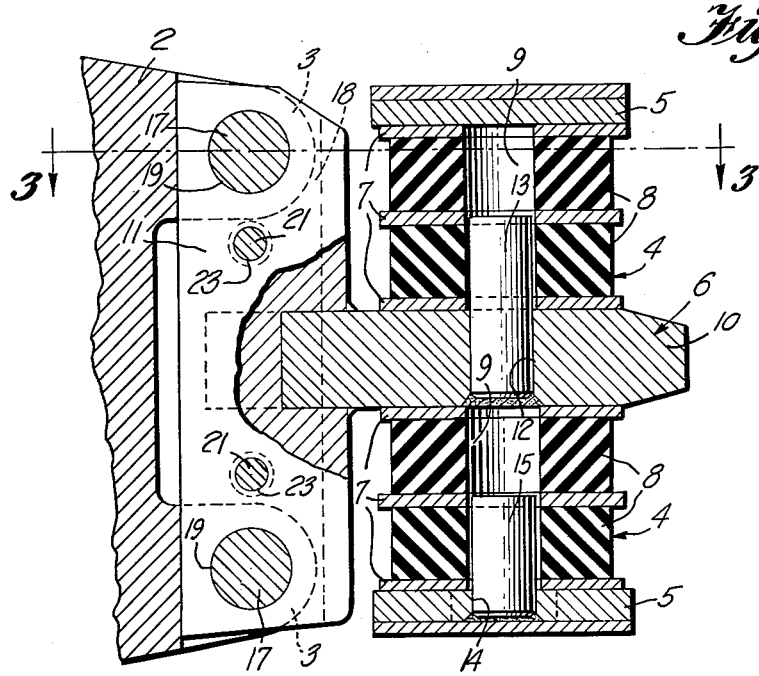
Figure 2 is a vertical section through the gears and mounting, taken substantially on the line 2—2 of Figure 1.
Figure 3:
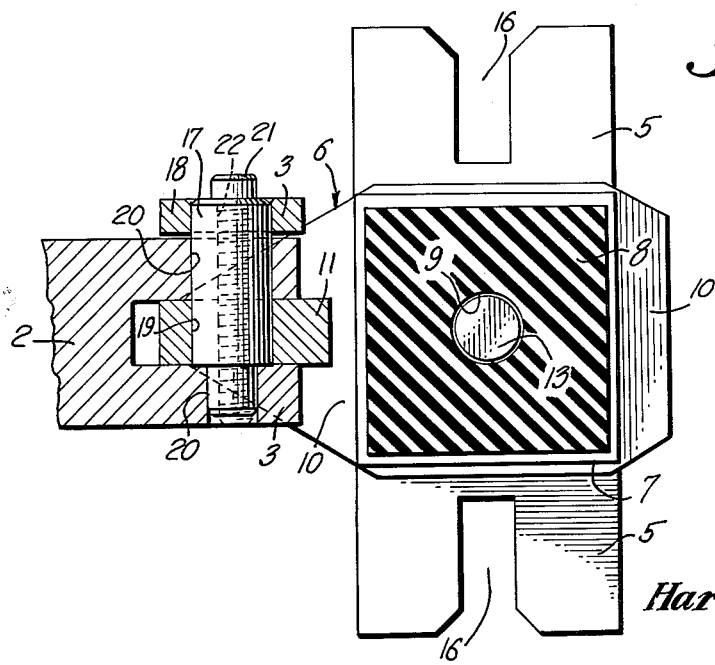
Figure 3 is a horizontal section through the device, taken on the line 3—3 of Figure 2.

In general, the invention consists in a mounting which includes a rubber torque bar supported at its ends upon a frame, and having a medially attached torque arm for attachment to the gear, or portion of a gear system, which the mounting is to support. Although the invention is described herein as being used to support a ring gear of a planetary system, the mounting may be used for the support of other structures having like problems of torque shocks.

Referring to the drawings in detail, the mounting of the present invention is shown at 1, and the non-rotatable internal ring gear 2 of a planetary gear system is illustrated attached to the mounting. The gear 2 will have pairs of horizontally spaced ears 3, vertically aligned for connection to the mounting member.

The mounting consists of a pair of bonded rubber and steel plate, sandwich type springs 4, bearing plates 5 for securing the mounting to the frame of a machine with which it is to be used, and a torque bar 6. Springs 4 are composed of top, bottom and central plates 7 of steel, and rubber blocks 8 bonded to the top and center, and center and bottom plates respectively. This provides a sandwich type pile unit in which the several plates of the unit are relatively movable due to the resiliency of the intervening rubber blocks. Each spring unit is drilled centrally to provide a vertical hole 9 extending completely through the unit.

The torque bar consists of a horizontally positioned torque arm 10, which lies between the sandwich units, and a vertically positioned connector bridge 11. The torque arm is a flat plate, preferably of larger outline than the spring units to provide a firm seating platform for the units. This plate is welded, or otherwise secured, to the connector bridge to form a T-shaped arm to transmit torque shock from the gear 2 to the rubber torque bar. The torque arm is drilled to provide an opening 12 to receive a mounting pin 13. The pin is welded to the arm and ground off flush with the bottom of the arm. The pin projects upwardly from the arm to extend within the opening 9 of the upper spring unit and position the unit on the torque arm. The pins 13 will be sufficiently long to bridge the bottom rubber block of the upper unit and project through the bottom and central plates of the unit. This will result in the upper rubber block of the spring unit being capable of taking some stresses in shear and compression as well as torque, while the lower block may yield to compression and torque stresses only.

The bottom bearing plate 5 is bored, similarly to the torque arm, to provide an opening 14 into which a pin 15 is fixed. Pin 15 will seat in the opening 9 of the lower spring unit in the same manner and with the same effect as pin 13 on the torque arm.

It will be obvious that when the several elements of the unit are assembled as described, and the bearing plates rigidly connected to a machine frame, by bolts through the end slots 16 of the bearing plates, the springs will be compressed and parts will be held against separation. Where, due to load shock direction, mounting conditions, etc., it is desired to use a mounting of opposite hand, the attachment of the spring units to the torque arm and bearing plates can be reversed, and the pin 13 extended downwardly from the torque arm, and the pin 15 extended downwardly from the top bearing plate 5. This will reverse the entire mounting arrangement and, of course, the action of the structure.

The ring gear 2 is mounted upon the vertical connector 11 of the torque bar by means of studs 17 fixed to a mounting plate 18. The vertical connector fits between the pairs of ears 3 on the ring gear and is provided with openings 19 for registry with openings 20 in the mounting ears of the gear. Studs 17 are spaced on the plate 18 so as to enter the openings 19 and 20 of the gear and connector-cap screws 21 extend through openings 22 in the mounting plate 18 and thread into threaded openings 23 in the connector to secure the mounting plate in place and hold the studs in position in the gear ears and connector openings. This securely fixes the gear to the torque bar.

When the mount is properly installed, and the ring gear assembly is in operation, shocks to the ring gear 2 will be primarily in torque, resulting in a tendency to turn the gear 2 about its central axis. This will result in tilting the torque arm 10 against the actions of the combined spring units. The compression and torque forces will be absorbed by the rubber blocks, and the resiliency of the blocks will return the arm, and gear, to normal position as soon as the strain is relieved. It will be obvious that bodily movement of the gear in any direction will be cushioned by the spring units through the rubber blocks. The action is essentially as though a vertical rubber column were used with a torque arm affixed at its middle and extending normal to the length of the bar, and the unit to be cushioned mounted upon the free end of the torque arm. The actual arrangement disclosed wherein the sandwich type spring units have pin mountings which limit, to an extent, complete freedom of movement of the spring units in some directions, provides added control and a superior mounting.

While in the above one practical embodiment of the invention has been disclosed, it will be understood that the precise structure shown and described is merely for purposes of illustration, and the invention may take other forms within the scope of the appended claims.

What is claimed is:

1. A shock absorbing mount for gear systems including a fixed member comprising, a torque arm connected at one end to the fixed member of the gear system, a spring unit composed of spaced top, bottom and central plates having rubber blocks bonded between them upon each side of the torque arm at the opposite end, bearing mounting plates at the outer sides of the spring units, the spring units having central openings extending completely therethrough, a pin mounted on the torque arm and seated in the opening in one spring unit, and a pin mounted on one of the bearing plates and seated in the opening in the other spring unit.

2. A shock absorbing mount for gear systems including a fixed member as claimed in claim 1 wherein the said pins bridge two of the plates of the spring units.

3. A shock absorbing mount for gear systems including a fixed member comprising, a torque arm connected at one end to the fixed member of the gear system, a spring unit on each side of the torque arm at the opposite end, bearing mounting plates at the outer sides of the spring units, the spring units having central openings extending completely therethrough, a pin mounted on the torque arm and seated in the opening in one spring unit, and a pin mounted on one of the bearing plates and seated in the opening in the other spring unit.

References Cited in the file of this patent

UNITED STATES PATENTS

| | | |
|---|---|---|
| 1,725,523 | Keys | Aug. 20, 1929 |
| 1,897,014 | Trott | Feb. 7, 1933 |
| 1,935,179 | Prear | Nov. 14, 1933 |
| 2,868,040 | Chamberlin | Jan. 13, 1959 |